US005785085A

United States Patent [19]

Halsnes et al.

[11] Patent Number: 5,785,085

[45] Date of Patent: *Jul. 28, 1998

[54] CLOSED FEEDING SYSTEM FOR LIQUID FUEL

[75] Inventors: Odd Halsnes, Båstad; Tor Audun Oftedal, Oslo, both of Norway

[73] Assignee: Forsvarets Forskningsinstitutt, Div. for Weapon and Material, Kjeller, Norway

[ * ] Notice: This patent issued on a continued prosecution application filed under 37 CFR 1.53(d), and is subject to the twenty year patent term provisions of 35 U.S.C. 154(a)(2).

[21] Appl. No.: 532,587

[22] PCT Filed: Jan. 16, 1995

[86] PCT No.: PCT/NO95/00012

§ 371 Date: Aug. 14, 1995

§ 102(e) Date: Aug. 14, 1995

[87] PCT Pub. No.: WO95/19527

PCT Pub. Date: Jul. 20, 1995

[30] Foreign Application Priority Data

Jan. 17, 1994 [NO] Norway .................................... 940161

[51] Int. Cl.$^6$ ............................. F16L 43/00; F02H 17/00

[52] U.S. Cl. .................... 137/563; 123/179.11; 137/140; 137/150

[58] Field of Search ..................................... 431/331, 319, 431/321; 137/545, 563, 150, 140; 123/179.11

[56] References Cited

U.S. PATENT DOCUMENTS

| | | | |
|---|---|---|---|
| 383,153 | 5/1888 | Siersdorfer | 137/150 |
| 1,871,043 | 8/1932 | Chalmers | 137/545 |
| 2,097,492 | 2/1937 | Lang . | |
| 3,131,751 | 5/1964 | Twibell | 137/545 |
| 3,162,235 | 12/1964 | Capehart | 137/563 |
| 3,233,652 | 2/1966 | Phillips | 123/179.11 |
| 3,783,888 | 1/1974 | Johnson | 137/140 |
| 4,274,380 | 6/1981 | de Vulpillieres | 137/563 |

FOREIGN PATENT DOCUMENTS

| | | |
|---|---|---|
| 799177 | 6/1936 | France . |
| 57-153118 | 9/1982 | Japan . |

*Primary Examiner*—A. Michael Chambers
*Attorney, Agent, or Firm*—Merchant, Gould, Smith Edell, Welter & Schmidt

[57] ABSTRACT

A closed feeding system for liquid fuel includes a flexible tube (1) extending from a reservoir (7) to a strainer housing (8) for differential pressure feeding of fuel, provided with pump assembly (3), in which system there is disposed a second, flexible tube (2) for return of fuel to the reservoir (7), the feed tube upstream and downstream of the pump assembly (3) being provided with non-return valves (4'–5') for flowing toward the strainer housing (8) and the return tube (2) optionally being provided with a non-return valve (6') for flowing toward the reservoir.

4 Claims, 1 Drawing Sheet

CLOSED FEEDING SYSTEM FOR LIQUID FUEL

FIELD OF THE INVENTION

The present invention relates to a feeding system for liquid fuel.

More specifically, the invention relates to a liquid fuel feeding system of the type comprising a flexible tube extending from a reservoir to a burner system for differential pressure feeding of the fuel.

BACKGROUND OF THE INVENTION

From the prior art in this field, there may be mentioned one-tube systems between a fuel tank and a burner system, wherein the feed tube is provided with an air vent screw and, in general, manually operated pump means.

When such a system is started and before it runs on its own, the air vent screw is opened in connection with the start of the pump means in order to expel the air from the feed tube, thus preventing that air pockets in the feed tube will reduce the differential pressure and result in a lack of or insufficient flow of fuel therethrough.

Feeding systems of the type outlined above and employed in prior art up till now have proved problematic in use, particularly in connection with systems developed for military field operations, where it is difficult to expel the air pockets adequately when the feed tube must lie in loops at various levels, and where poor light often increases the difficulties.

SUMMARY OF THE INVENTION

The present invention aims at improving the state of the art with respect to feeding fuel from a reservoir to a burner system, and it thus relates to a closed feeding system for liquid fuel comprising a flexible tube provided with pump means and extending from a reservoir to a burner system for differential feeding of fuel, and this feeding system is characterized by further comprising a second, flexible tube, running parallel to the first one, for return of fuel to the reservoir, the feed tube upstream and downstream of the pump being provided with non-return valves for flowing toward the strainer housing and the return tube optionally being provided with a non-return valve for flowing toward the reservoir.

The following description and the drawing accompanying it are based on an embodiment wherein the two non-return valves mounted in the feed tube are placed immediately upstream and downstream of the pump means, whereas the non-return valve of the return tube is immediately downstream of the strainer housing of the burner system, this also being the preferred embodiment of the invention.

In a closed feeling system as described above, three substantial advantages are obtained:

(1) greater ease in feeding the burner system from the tube without spill;

(2) flushing of the inlet strainer for the burner apparatus; and (3) emptying the system back to the reservoir without spill when the burner system is to be moved.

The invention is to be further explained with reference to the enclosed drawing.

DETAILED DESCRIPTION OF THE INVENTION & DRAWING

Figure 1:
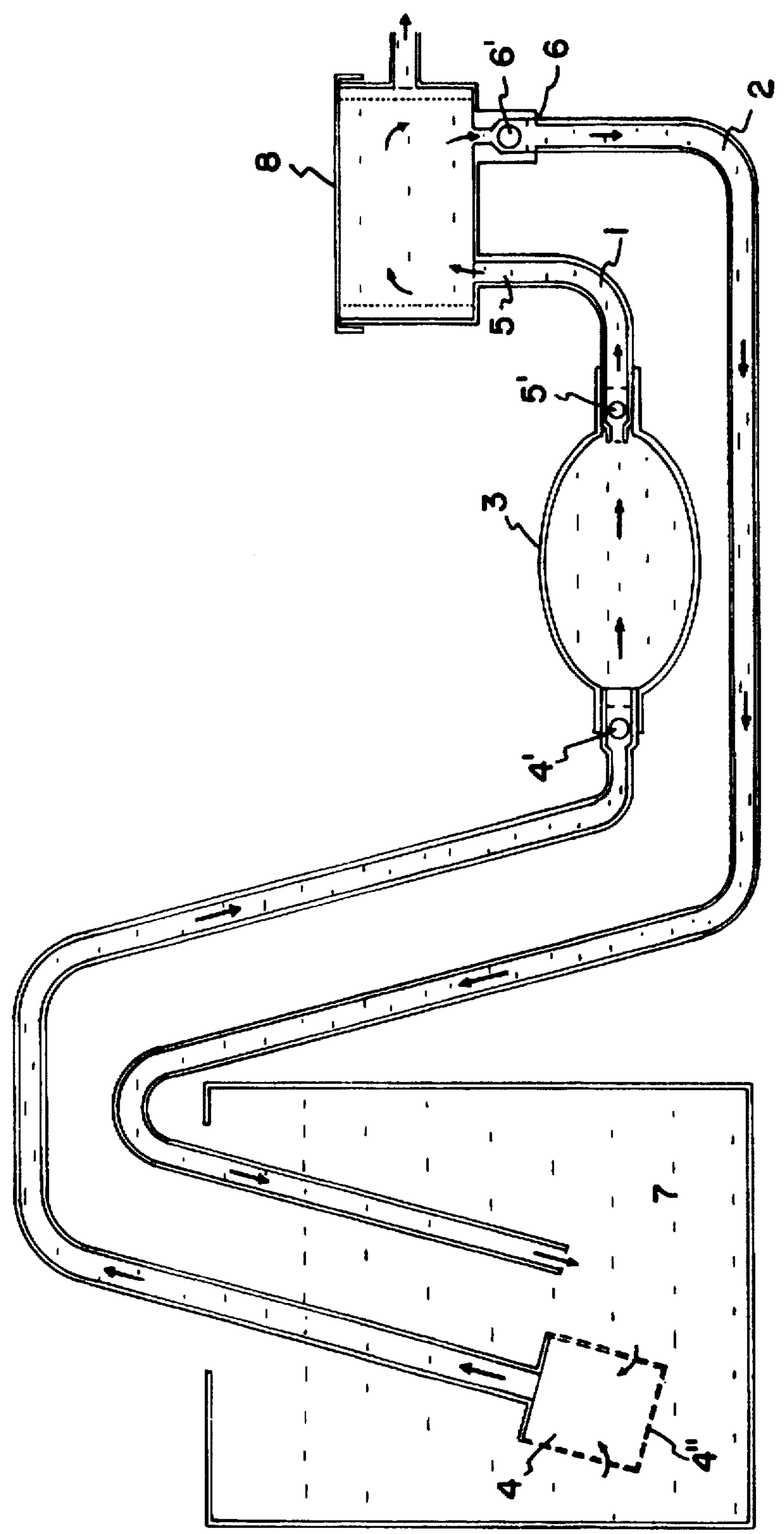

After the two lines, the feed line 1 and the return line 2 on one side are connected to the fuel reservoir 7 and the strainer housing 8 in a burner system (not shown), the pump, here shown as a manual "squeeze pump," is used to draw fuel from the reservoir 7 to the strainer housing 8.

According to the invention, the feed line in the upstream pump 3 is provided with a non-return valve 4' and the downstream pump 3 with a non-return valve 5'.

These valves are necessary for the function of the "squeeze pump."

In order to eliminate the above suggested problems of the starting phase, i.e., the use of an air vent screw on the burner side with the pertaining danger of overflow and spill, the present feeding system is, as mentioned above, provided with a return tube 2 extending, in principle, parallel to the feed tube 1 and preferably secured thereto.

The return tube is in its inlet end 6 at the strainer housing 8 provided with a non-return valve 6'. This return tube ensures that fuel that is pumped to the strainer housing may, in a closed system, be passed back to the reservoir 7 without spill in the surroundings.

The non-return valve 6' is a preferred embodiment of the invention, said valve ensuring that the return tube 2 in a ready filled system during operation of the burner will not also work as a siphon feed tube in addition to the actual feed tube 1, this being disadvantageous since, according to yet another preferred embodiment, a coarse strainer 4" is mounted at the inlet end 4 of the feed tube 1 in order to entrap the coarser impurities in the fuel.

The finer impurities in the fuel which might pass through the strainer 4", the feed tube 1, the pump 3 and arrive at the strainer hosing 8, will be entrapped there by the fine strainer mounted in the strainer housing 8.

Since the outlet end 5 of the feed tube 1 and the inlet end 6 of the return tube 2 are disposed on the same side of the fine strainer in the strainer housing 8, this fine strainer will be flushed each time the fuel by means of the pump 3 is pressed in through the outlet 5 of the tube 1, past the fine strainer and out through the inlet 6 of the tube 2.

When the burner 11 Is moved during military operations in the field, the inlet end 4 of the feed lines is lifted above the fuel level of the fuel reservoir, whereafter the fuel in the feed tube 1 and the return tube 2 by means of the pump 3 can be pumped back to the reservoir through the return tube 2 without any spill in the surrounding area.

The non-return valves 4',5' and 6' are preferably of the ball seat type, but may of course be of any type which safeguards the system against unintentional return flow.

All connections and through passages are of types known per se and shall not be further described here, the same applying to the burner unit itself, as indicated above.

The pump 3 is preferably a manually operated balloon pump, known per se.

By means of the closed feeding system of the invention, the advantages indicated in the beginning are obtained, even if the field burner, fed by means of the described feeding system, is used under extremely unfavorable topographical conditions of greatly varying height differences between the burner section and the reservoir section, and the system also allows use across a relatively large distance, as may often be required during field operations.

We claim:

1. A closed feeding system for liquid fuel, comprising:

a reservoir;

a strainer housing;

a first flexible tube extending from the reservoir to the strainer housing, the first flexible tube having a first end being positioned flexibly in the reservoir proximate a fuel level in the reservoir and a second end being coupled to the strainer housing;

a second flexible tube running generally parallel to the first flexible tube, for return of fuel from the strainer housing to the reservoir, the second flexible tube having a first end being positioned flexibly in the reservoir proximate the fuel level in the reservoir and a second end being coupled to the strainer housing;

a pump being disposed between the first and second ends of the first flexible tube for drawing fuel from the reservoir to the strainer housing, the pump being inactive after being used to start the feeding system;

a first non-return valve being coupled to the pump at upstream of fuel flow in the first flexible tube;

a second non-return valve being coupled to the pump at downstream of the fuel flow in the first flexible tube; and the first and second flexible tubes being arranged and configured such that the first ends of the first and second tubes can be positioned below the fuel level in the reservoir when the feeding system is operated to feed the fuel and can be positioned above the fuel level in the reservoir when the first and second flexible tubes are to be drained using the pump to avoid fuel spillage during transportation of the system.

2. A closed feeding system according to claim 1, further comprising a third non-return valve which is coupled to the second flexible tube at the second end of the second flexible tube.

3. A closed feeding system according to claim 1, further comprising a coarse strainer being coupled to the first flexible tube at the first end of the first flexible tube.

4. A closed feeding system according to claim 1, wherein the first flexible tube has a higher elevation in gravity than the second flexible tube.

* * * * *